(12) United States Patent
Majerus et al.

(10) Patent No.: US 7,074,022 B2
(45) Date of Patent: Jul. 11, 2006

(54) DISCHARGE VALVE ASSEMBLY FOR RECIPROCATING COMPRESSORS

(75) Inventors: Benjamin Alan Majerus, Bristol, VA (US); Peter Douglas Mantell, Bluff City, TN (US); Philip Scott Leonard, Bristol, VA (US); David Turner Monk, Bristol, VA (US); John Richard Walters, Jr., Abingdon, VA (US)

(73) Assignee: Bristol Compressors, Inc., Bristol, VA (US)

( * ) Notice: Subject to any disclaimer, the term of this patent is extended or adjusted under 35 U.S.C. 154(b) by 0 days.

(21) Appl. No.: 11/065,962

(22) Filed: Feb. 25, 2005

(65) Prior Publication Data

US 2005/0169785 A1 Aug. 4, 2005

Related U.S. Application Data

(62) Division of application No. 10/443,378, filed on May 22, 2003, now Pat. No. 6,896,495.

(51) Int. Cl.
*F04B 39/10* (2006.01)

(52) U.S. Cl. .................. 417/559; 417/564; 417/567; 137/512.4; 137/857

(58) Field of Classification Search .............. 417/559, 417/564, 567, 415, 454, 539, 569; 137/857, 137/512.4; 92/128, 146, 147, 68, 73
See application file for complete search history.

(56) References Cited

U.S. PATENT DOCUMENTS

| | | | |
|---|---|---|---|
| 2,681,054 A | 6/1954 | Boghossian | |
| 2,718,897 A * | 9/1955 | Andrews | 137/102 |
| 3,786,834 A * | 1/1974 | Garland | 137/540 |
| 3,998,571 A | 12/1976 | Falke | |
| 4,060,098 A * | 11/1977 | Bares et al. | 137/594 |
| 4,213,620 A * | 7/1980 | Kennedy et al. | 277/596 |
| 4,721,443 A * | 1/1988 | Allen | 417/539 |
| 4,834,632 A * | 5/1989 | Gatecliff et al. | 417/534 |
| 4,867,650 A | 9/1989 | Ikeda et al. | |
| 5,022,833 A | 6/1991 | Kandpal et al. | |
| 5,078,582 A | 1/1992 | Ohbayashi et al. | |
| 5,390,700 A | 2/1995 | Fink et al. | |
| 5,829,960 A | 11/1998 | Dreiman | |
| 6,368,085 B1 * | 4/2002 | Collings | 417/569 |
| 6,382,927 B1 | 5/2002 | Sonobe et al. | |

FOREIGN PATENT DOCUMENTS

JP 59-208181 11/1984

* cited by examiner

*Primary Examiner*—Charles G. Freay
(74) *Attorney, Agent, or Firm*—McNees Wallace & Nurick LLC

(57) ABSTRACT

A reciprocating compressor including cylinder block with a plurality of cylinder bores. A piston is positioned in each bore and mounted to move in response to the a crankshaft, causing each piston to reciprocate within the cylinder bore. The compressor further includes a cylinder head, which includes bores corresponding to the bores in the cylinder block, and a suction port in fluid communication with a source of compressible gas and a plurality of suction plenum. Protrusions or ribs extend into the suction plenum. The cylinder head also includes a discharge plenum in communication with the outlet ports of the valve plate. Interposed between the cylinder head and the cylinder block is a valve plate assembly having a discharge valve, and a discharge valve retainer having a pair of radii assembled to the valve plate by snap fitting a cylinder head gasket over the discharge valve and retainer.

15 Claims, 8 Drawing Sheets

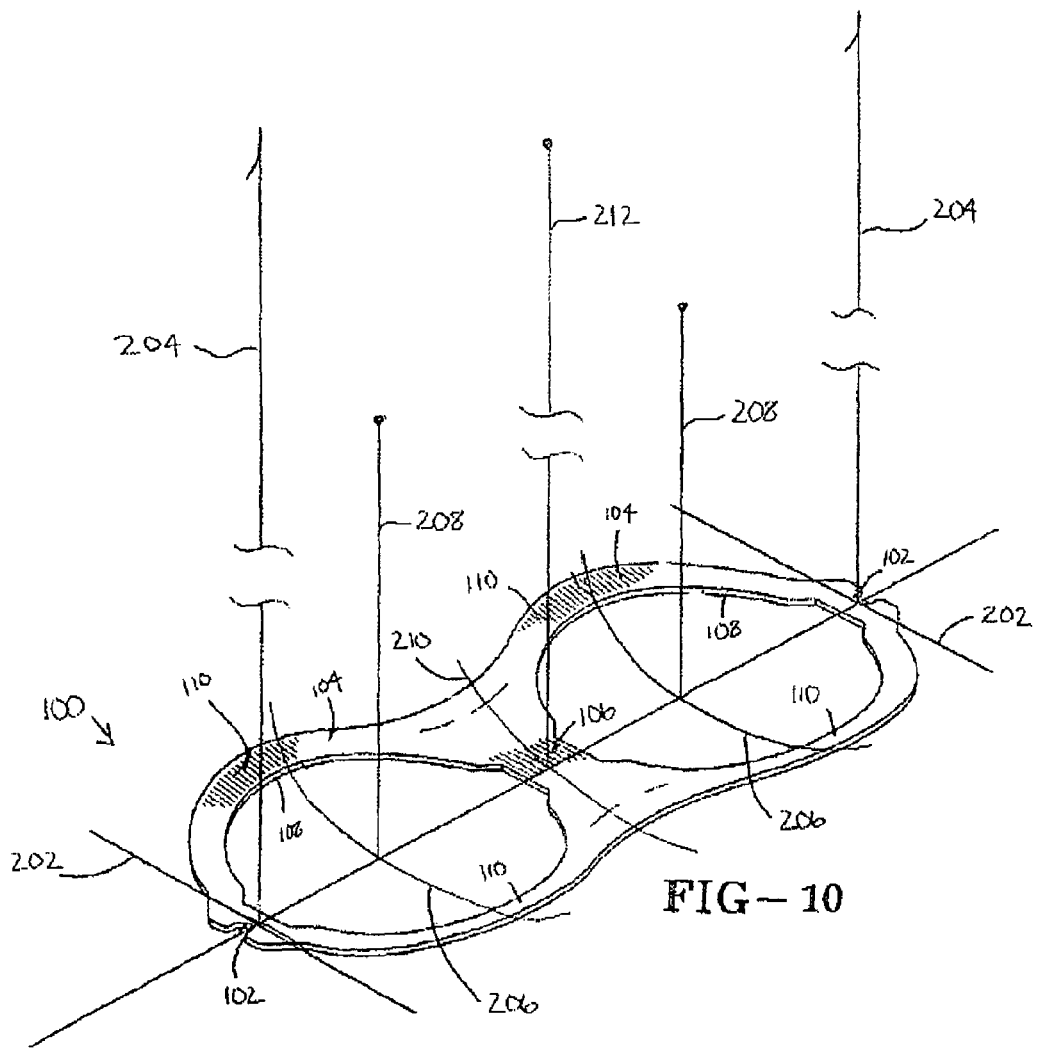

DISCHARGE VALVE ASSEMBLY FOR RECIPROCATING COMPRESSORS

This Application is a divisional application of application Ser. No. 10/443,378, filed May 22, 2003, now U.S. Pat. 6,896,495, entitled CYLINDER HEAD AND VALVE PLATE ASSEMBLY FOR RECIPROCATING COMPRESSOR.

FIELD OF THE INVENTION

The present invention is relates to an improved combination of a cylinder head and valve plate assembly for use with a reciprocating compressor for compressing gases and specifically to a novel configuration and arrangement of components of the valve plate assembly and cylinder head.

BACKGROUND OF THE INVENTION

Reciprocating compressors typically operate with valve plate assemblies that include a valve plate to which is affixed a suction valve and a discharge valve to control the intake and discharge of refrigerant gas. A valve plate gasket is typically installed adjacent the cylinder head and the cylinder block. Prior art designs include a separate discharge valve retainer for each bore in the compressor. Certain designs that employ a single discharge valve retainer include a large number of bend radii, requiring very accurate parts in order for the discharge valve to function properly. The large number of bend radii is required due to the arrangement of discharge ports on the valve plate.

Many of these assemblies are discussed in the prior art. For example, U.S. Pat. No. 4,867,650 ('650 patent) and U.S. Pat. No. 6,368,085 ('085 patent) disclose refrigeration compressors utilizing suction valves and valve plate gaskets comprising a single piece of steel. Slots in these suction valves are formed by slotting sheet of steel to form the valve and valve plate gasket and suction valve. For example, in the '085 patent, the slot is of variable width so as to allow for uniform finishing operations on the valve so as to reduce or prevent premature valve failure. These slots do not provide additional flow area through the valve for gas when the valve is open during a suction or intake stroke of the compressor piston.

Other assemblies such as one described in U.S. Pat. No. 6,382,927 position the valve plate assembly that position the valve plate relative to the cylinder head by utilizing pins projecting from the cylinder head which assists in the assembly, fit-up and handling of this plurality of components. What is needed is a design that not only simplifies the assembly and handling of the valve plate assembly, but that also improves the operating efficiency of the compressor. When this assembly is used in a semi-hermitic design, it provides the additional advantage of making disassembly and repair more convenient.

SUMMARY OF THE INVENTION

The present invention comprises a reciprocating compressor that includes a cylinder block with a plurality of cylinder bores. A piston is positioned in each bore. Each piston is mounted to move in response to the a crankshaft, causing each piston to reciprocate within the cylinder bore. The compressor further includes a cylinder head which includes bores corresponding to the bores in the cylinder block. The cylinder head includes a suction port in fluid communication with a source of compressible gas and a plurality of suction plenum in the cylinder head. Protrusions or ribs extend into the suction plenum. The cylinder head also includes a discharge plenum in communication with the outlet ports of the valve plate. As is well known, the discharge plenum of the compressor is in fluid communication through an outlet port with the remaining equipment in the air conditioning or heat pump system, such as the condenser. Interposed between the cylinder head and the cylinder block is a valve plate assembly.

The valve plate assembly of the present invention comprises a cylinder head gasket, a discharge valve retainer, a discharge valve, a valve plate and a suction valve.

The cylinder head gasket of the present invention is a flat piece of metal, having a plurality of penetrations corresponding to penetrations in the cylinder head, one face of the gasket contacting a face of the cylinder head. The other face of the gasket contacts the valve plate. The gasket provides a seal for the suction and discharge plenums of the cylinder head during compressor operation.

Attached to the cylinder head gasket is the discharge valve retainer. The discharge valve retainer is a single piece that includes a plurality of ports corresponding to the number of bores in the cylinder head. The discharge valve retainer is positioned along its outer periphery adjacent to the cylinder head gasket. The discharge valve retainer is a single piece backer for the discharge valve.

The discharge valve is a single piece of spring steel having a plurality of ports corresponding to the number of bores in the cylinder head and positioned between the valve plate and the discharge valve retainer such that the spring steel can cover the discharge penetrations in the valve plate. The discharge valve retainer limits the movement of the discharge valve away from the valve plate. The discharge valve is positioned along its outer periphery between the valve plate and the discharge valve retainer.

The valve plate is shaped to correspond substantially to the shape of the cylinder head and block. The valve plate includes two opposed major surfaces joined by a periphery wall. A first major surface faces the cylinder head, while the second, opposed surface faces the cylinder block. The valve plate includes a plurality of penetrations. The valve plate is a single piece of increased size compared to many prior art valve plate designs. Some of the penetrations in the valve plate are sealed by the discharge valve (when the compressor is operating in the suction mode), while other penetrations in the valve plate are sealed by the suction valve (when the compressor is operating in the compression mode). Some of the remaining penetrations are non-functional except to decrease stiffness and assist in controlling the flatness of the plate during machining. Pressed into the valve plate includes a plurality of pins projecting from the major surfaces. The pins are not readily removable, being fixed into position by press fitting or otherwise interference fitting. A pair of pins projects from the first major surface in the direction of the cylinder head. The pins position the discharge valve and discharge valve retainer, passing through their outer periphery. The pins extend into penetrations in the cylinder head gasket, thereby locating these parts in relation to each other. A second pair of pins projects from the second major surface in the direction of the cylinder block. A pair of pins projecting from the second major surface are associated with each bore in the cylinder block. For a design with two bores, there are four pins.

A plurality of suction valves are located between each set of these pins on the second major surface between the valve plate and the cylinder block, each suction valve associated with a bore in the cylinder head. Each suction valve is a single piece of spring steel having a plurality of apertures. Each suction valve is positioned by one of the pair of pins projecting from the second major surface. The total area of the apertures has been increased in order to provide additional flow area for suction gas through the valve. The suction valve seals openings in the valve plate when the compressor is in the compression mode.

An advantage of the present invention is that the valve plate assembly of the present invention provides a valve design that increases overall compressor efficiency while maintaining compressor reliability. The valve design is simpler than prior art designs and can be produced at a lower cost. The compressor Energy Efficiency Ratio (EER) measured at ARI (45/100) and ARI (45/130) for a current compressor is 10.9 EER and 17.5 EER respectively, while for a compressor incorporating the valve plate assembly of the present invention, the EER at ARI (45/100) is 11.5 EER and ARI (45/130) is 19.1 EER. The increased mechanical efficiency allows compressor performance goals to be met while utilizing a cheaper, lower efficiency motor than would otherwise be required.

Another advantage of the present invention is that the arrangement and orientation of the parts provides a more reliable discharge valve.

Yet another advantage of the present invention is that a more direct suction gas path into the cylinder head along with increased suction port area provides increased compressor efficiency while reducing suction flow losses and superheat.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 10 is a perspective view of a discharge valve retainer of the present invention illustrating the radii at different locations of the retainer.

DETAILED DESCRIPTION OF THE INVENTION

Figure 1:
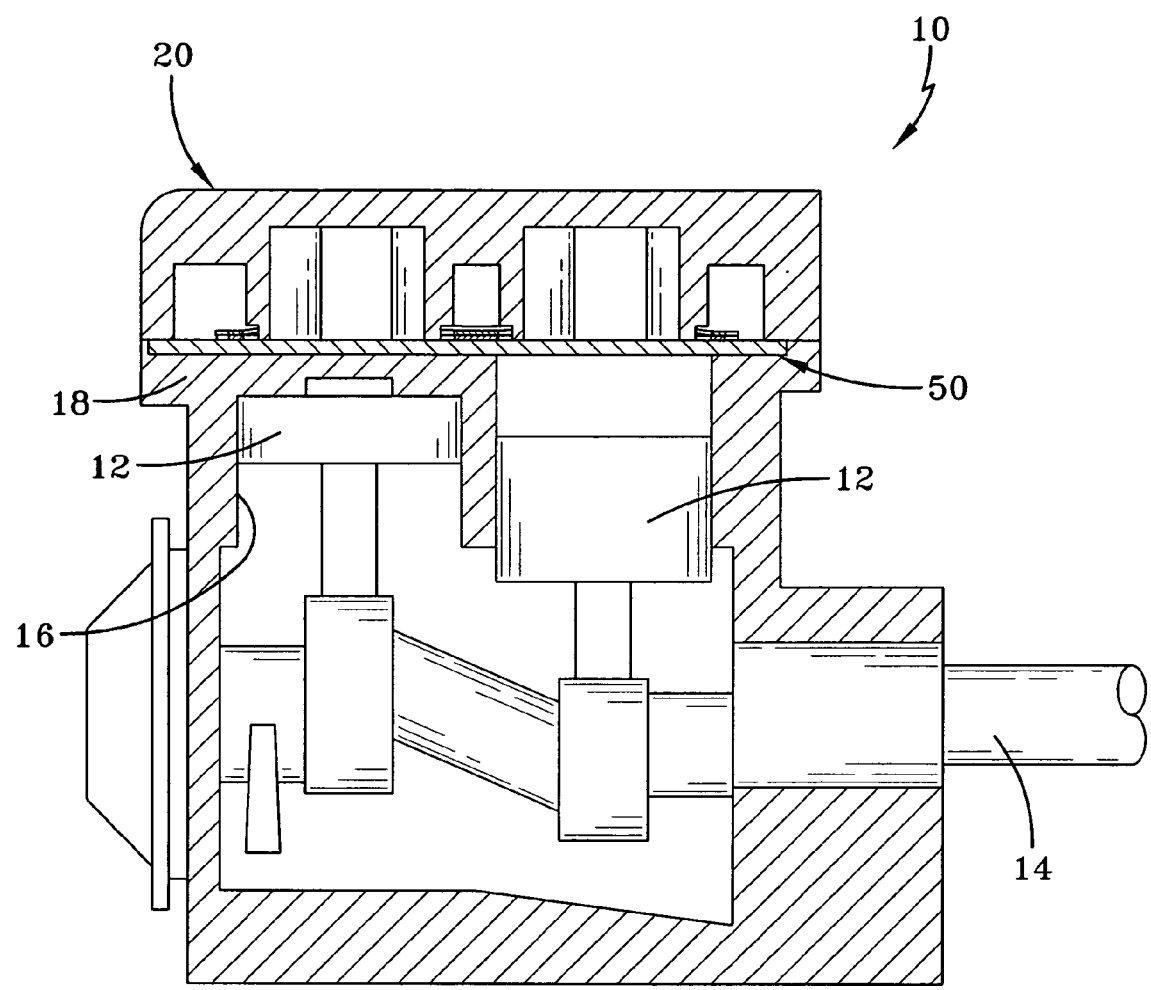
FIG. 1 is a partial cross-sectional view of a two-piston reciprocating compressor showing a valve assembly of the present invention.

The description of the valve plate assembly and cylinder head and its operation will be given by reference to the accompanying illustrations and drawings provided as FIGS. 1–9. The valve plate assembly and cylinder head of the present invention when utilized in a reciprocating compressor allow the compressor to operate at Seasonal Energy Efficiency Ratios (SEER) of 12 and greater. FIG. 1 is a partial cross-section of a reciprocating compressor 10. The compressor 10 of FIG. 1 discloses a dual piston compressor. However, the current invention can be used in multi-piston reciprocating compressors operating with multiple pistons, its use not be limited to the dual piston compressor shown in FIG. 1. Each piston 12 is connected to a crankshaft 14 which is caused to turn by any conventional power source (not shown). Operation of crankshaft 14 causes each piston 12 to reciprocate in a respective bore 16 located in cylinder block 18. A cylinder head 20 of the present invention overlies cylinder block 18. The valve plate assembly 50 of the present invention is positioned between cylinder block 18 and cylinder head 20.

Figure 2:
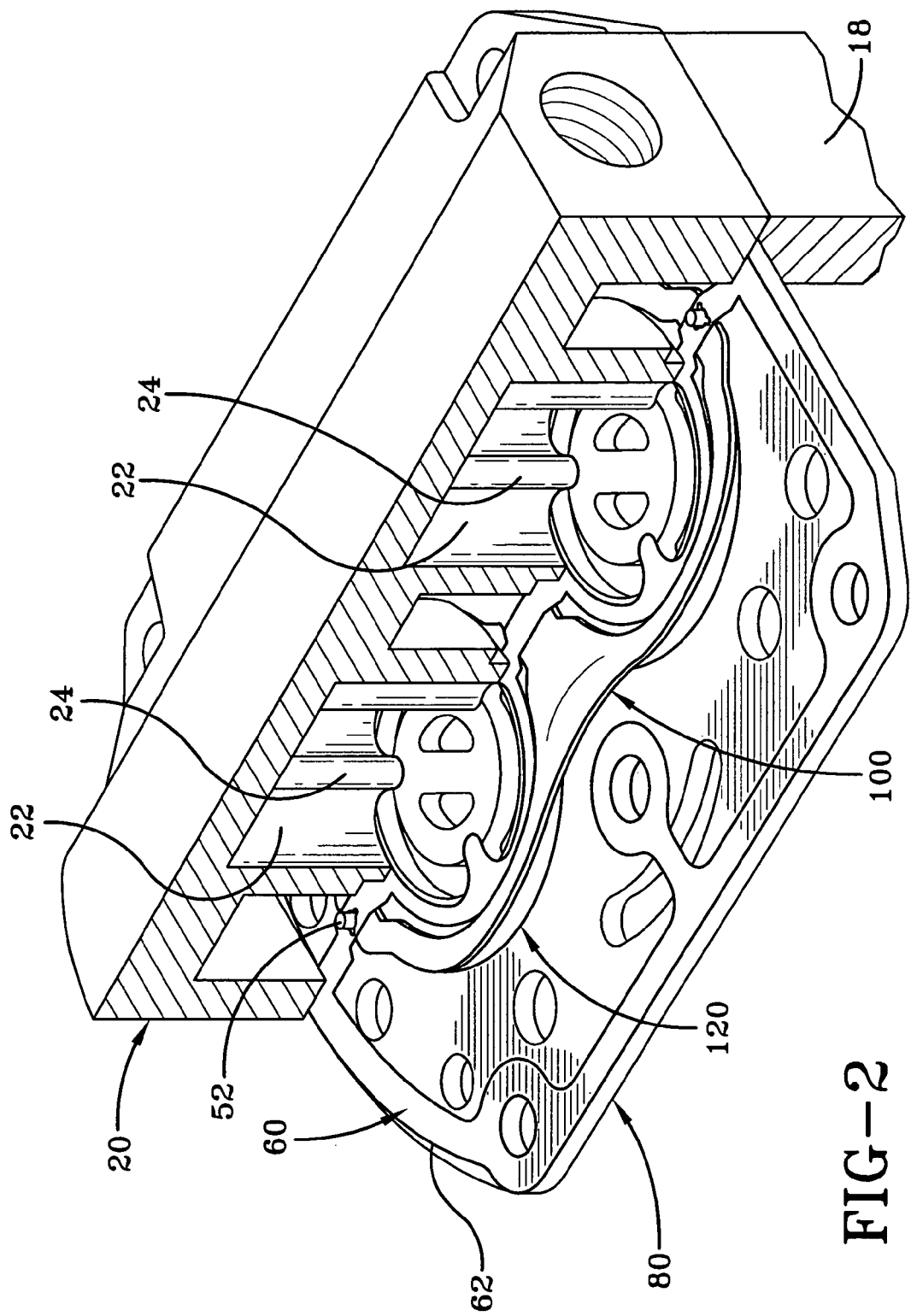
FIG. 2 is a cross-sectional view of the valve plate assembly and cylinder head of the present invention.

Referring now to FIG. 2, which is a cross-sectional view of the valve plate assembly and cylinder head 20 of the present invention, in which cylinder head 20 includes a pair of bores 22 corresponding to bores 16 in cylinder block 18. Bores 22 include a plurality of ribs 24 disposed around the interior of bores 22. Valve plate assembly 50 is disposed between cylinder head 20 and cylinder block 18. Valve plate assembly includes a cylinder head gasket 60 and a valve plate 80 disposed between cylinder head 20 and cylinder block 18, cylinder head gasket being positioned between cylinder head 20 and valve plate 80. Discharge valve retainer 100 is positioned adjacent to cylinder head gasket 60 by indexing means. Discharge valve retainer 100 lies completely within a perimeter 62 of cylinder head gasket 60. The indexing means are shown as pins 52 in the preferred embodiment contacting retainer 100 at opposite ends. These pins 52 extend upward from valve plate 80 toward cylinder head 20 and are not limited to pins, as any mechanical means to position parts in relationship to valve plate 80 may be utilized. In a preferred embodiment, pins 52 are press fit into a pair of apertures in the valve plate 80. These pins 52 may be assembled into valve plate 80 by any convenient means, such as for example by shrink fit or even by tack welding. The pins may also be machined as an integral part of valve plate 80, although such integral pins are expensive. Located between discharge valve retainer 100 and valve plate 80 is discharge valve 120. Discharge valve 120 is positioned by indexing means, pins 52, contacting valve 120 at opposite ends of valve 120.

Figure 3:
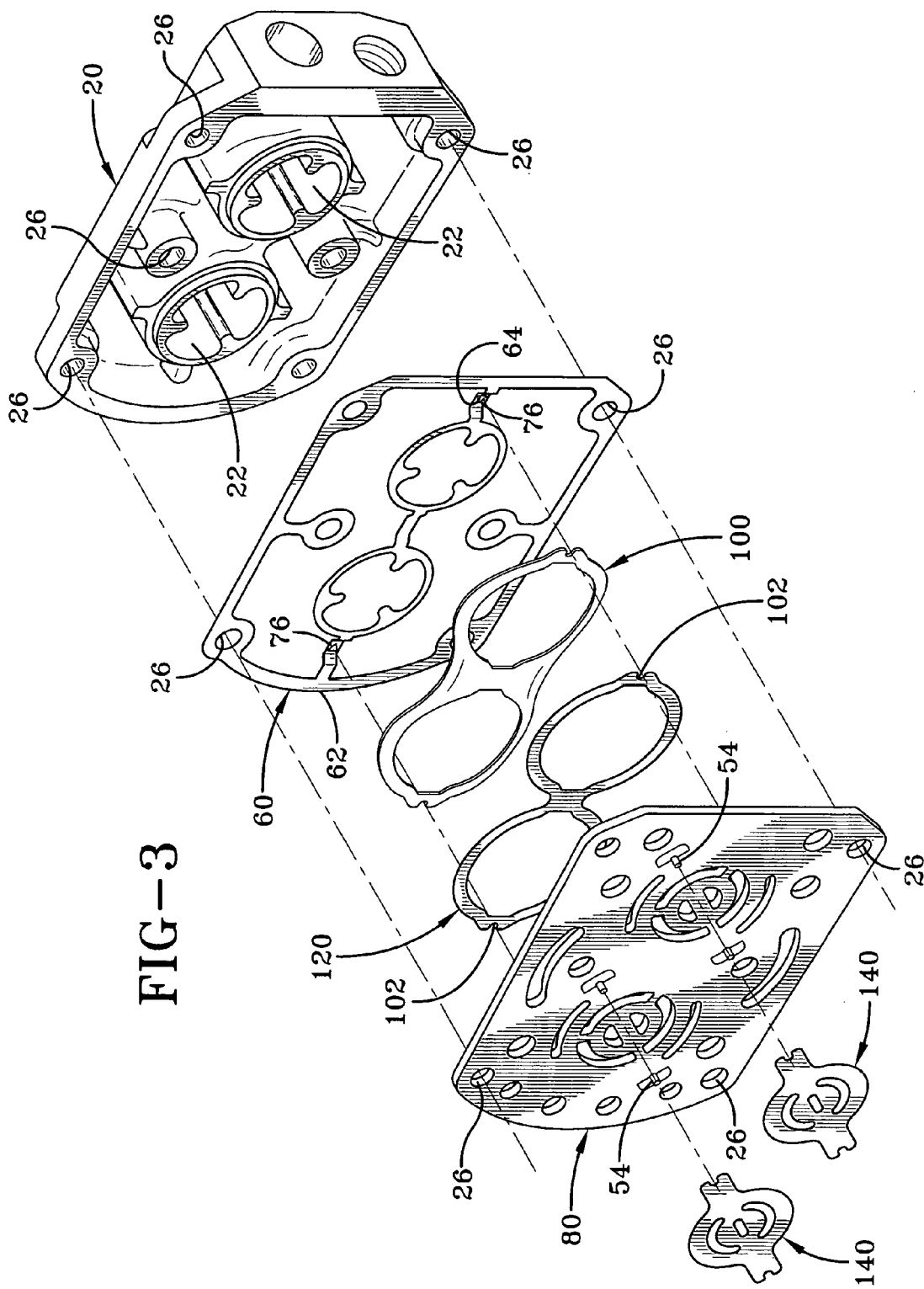
FIG. 3 is an exploded view of the valve plate assembly of the present invention.

FIG. 3 is an exploded view of the valve plate assembly 50 and cylinder head 20 of the present invention, which more clearly indicates the arrangement of the various elements of the invention. Cylinder head gasket 60 is disposed between cylinder head 20 and valve plate 80. Cylinder head includes a pair of bores 22 corresponding to bores in cylinder block. As can be seen, a plurality of coaxial apertures 26 extend through perimeters of each of cylinder head 20, cylinder head gasket 60 and valve plate 80. Similar apertures extend through cylinder block (not shown). These apertures 26 accept a fastening means (not shown), such as a bolt and a nut, which allow the elements to be sealingly assembled to each other to prevent fluid leakage at their interfaces. Discharge valve retainer 100 lies within perimeter 62 of cylinder head gasket 60. Between valve plate 80 and discharge valve retainer 100 is discharge valve 120. Also depicted is one of a pair of pins 52 which are assembled to valve plate 80 as previously discussed. These pins extend through locating means in discharge valve 120 and discharge valve retainer 120. These locating means in the preferred embodiment include apertures or slots 102, 122 as shown in the preferred embodiment of FIG. 3, located at opposite ends of valve 120 and valve retainer 100 sized to accept pins 52. However, these locating means may be any convenient means of locating the valve 120 and valve retainer 100 in relation to the valve plate 80. The pins are captured in cylinder head gasket 60. While any means may be used to capture the pins, in the preferred embodiment, the pins 52 are captured by an interference fit with slots 64 in cylinder head gasket. Once assembled and captured in slots 64, cylinder head gasket 60, discharge valve retainer 100, discharge valve 120 and valve plate 80 conveniently can be handled as an assembly. Valve plate 80 also includes a plurality of locating means, pins 54 in the preferred embodiment press fit into apertures in the valve plate as discussed above, extending from the side of valve plate 80 opposite from cylinder head 20. These pins 54 extend toward cylinder block (not shown) and position suction valve 140 in relation to valve plate 80. As shown in the preferred embodiment, there is a suction valve 140 corresponding to each bore 16 in cylinder block 18. In the embodiment shown, there are two suction valves. However, a single suction valve combining the features of two or more individual suction valves and that correspond to each bore in cylinder block 18 are within the scope of this invention. The pins are located by locating means, such as slots or apertures in suction valves, similar to the locating means in discharge valve discussed above.

Figure 4:
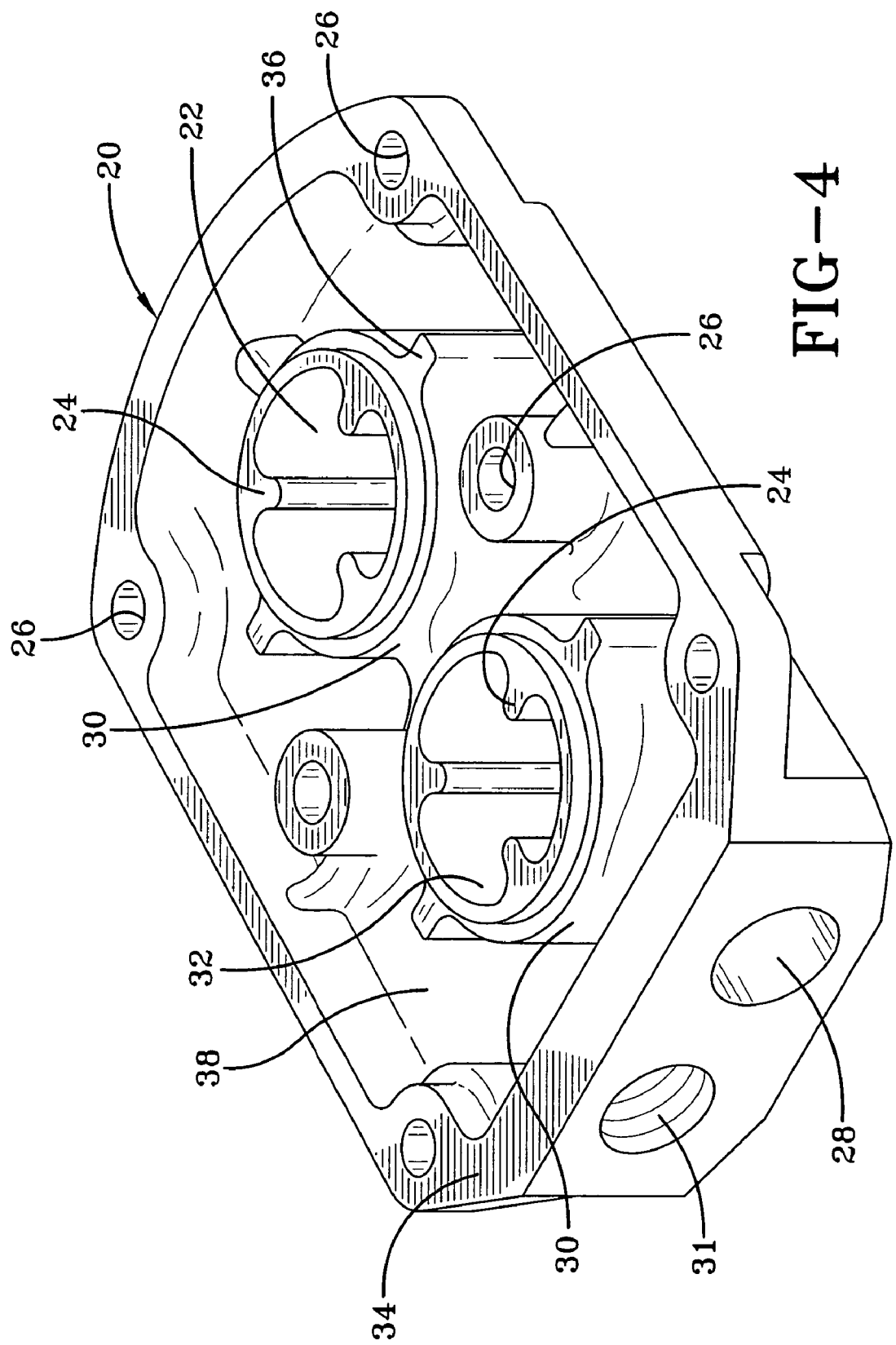
FIG. 4 is a perspective view of the cylinder head of the present invention.

Cylinder head 20 is shown in FIG. 4. A cylinder head includes a plurality of bores. In the preferred embodiment of a two-piston compressor, there are two bores 22 in cylinder head 20. As is well-known, each bore is in fluid communication with a suction plenum 28, which is in fluid communication with a source for a refrigerant fluid, typically from an evaporator (not shown). This low pressure fluid is drawn from the refrigerant fluid source, through the suction plenum 28, into cylinder head bore 22 and into the corresponding bore 16 of the cylinder block 18 on the downstroke or suction stroke of piston 12. Each bore 22 of cylinder head 20 includes a plurality of ribs 24, three in the preferred embodiment shown in FIG. 4, extending radially inward into bore 24 from bore wall 30. Each bore 24 also includes a circumferential surface 30 coaxial with wall 32 of bore 22, but having a larger diameter with bore wall 32. Circumferential surface 30 sits below the top surface of bores 22 and flange face 34 of cylinder bore 32. Circumferential surface 30 optionally includes a pair of outwardly-extending radial ribs 36. These outer ribs 36 control retainer lift. Cylinder head 20 also includes a high pressure discharge region 38 in fluid communication with a discharge port 31 to deliver high pressure refrigerant gas to a component in a heating and air conditioning system such as a condenser.

Figure 5:
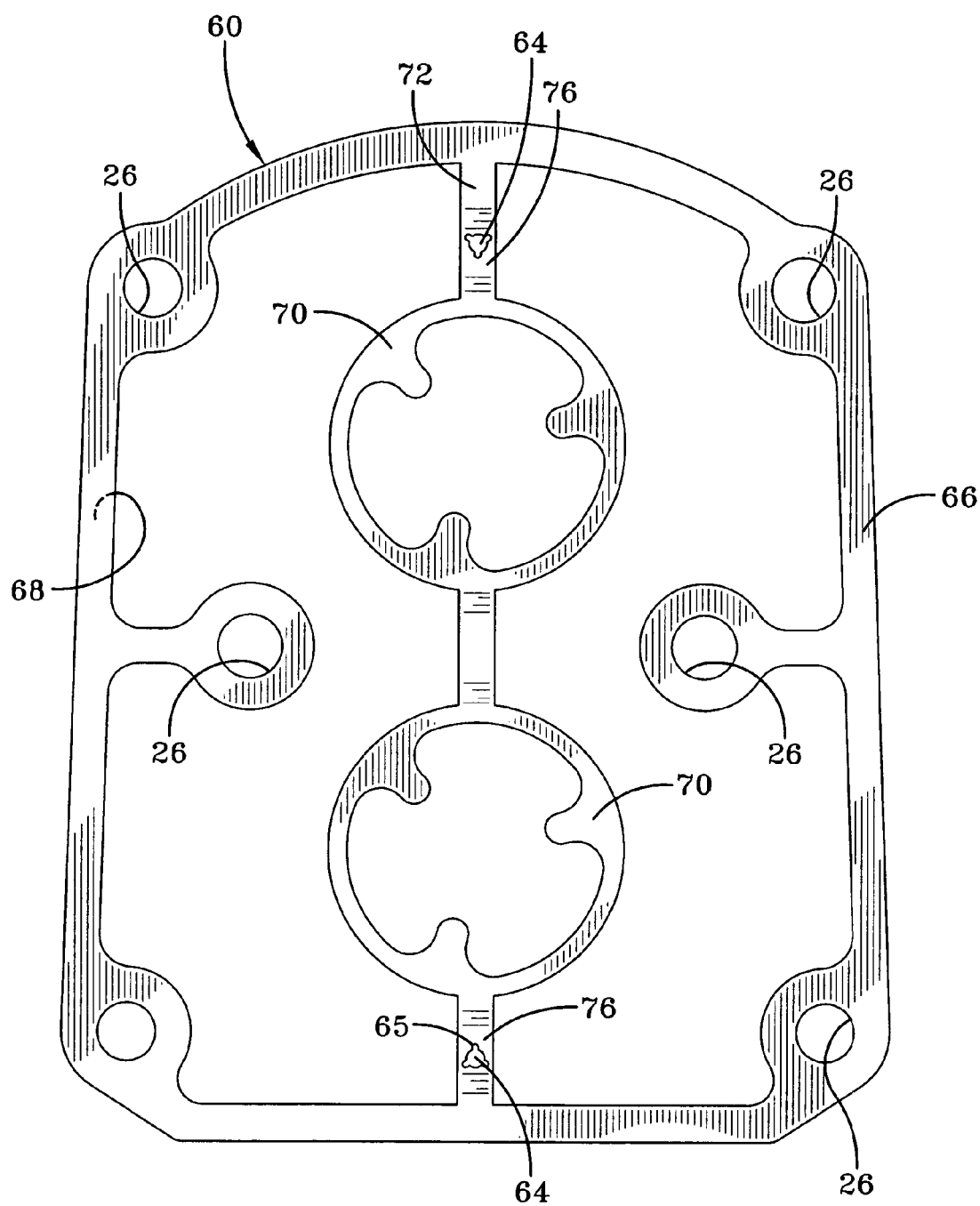
FIG. 5 is top view of a cylinder head gasket of the present invention.

Cylinder head gasket 60 is shown in FIG. 5. Cylinder head gasket 60 includes a perimeter 62 having a first surface 66 and an opposed second surface 68. First surface 66 contacts flange face 34 of cylinder head 20. Second opposed surface 68 contacts surface of valve plate 80. Gasket 60 includes a plurality of apertures 26 corresponding to apertures 26 in cylinder head 20 and valve plate 80. Gasket 60 also includes a ring 70 corresponding to each bore 22 in cylinder head 20, each ring 70 mating with the top of bore walls 32 and ribs 24 of cylinder head 20. In the preferred embodiment, there are two bores in cylinder head 20, so that there are two rings 70 as shown in FIG. 5. Rings 70 are connected to perimeter 62 by strips 72 and optionally to each other by central strip 74. Each of strips 72 includes a slot 64 to position gasket 60 in relation to valve plate as previously discussed. Preferably, slots 64 are arcuately shaped, resembling a star pattern, being slightly smaller than a means for locating, locating pin, extending from the valve plate, so that the retainer can be snap fit into position onto valve plate, as will be discussed below. Strips 72 and 74 lie outside the plane of rings 70 and perimeter 62, thereby providing gasket 60 with a stepped appearance in which the strips 72, 74 have a region 76 that is raised (when viewed from the cylinder head 20 toward the valve plate 80) above the plane of the gasket perimeter. Opposed ends of discharge valve retainer 100 and discharge valve 120 are positioned in this raised region 76. Gasket 60 preferably is a metallic material, most preferably a thin, stamped steel having a thickness of about a few thousandths of an inch. The exact thickness is not an important or limiting feature of the gasket.

Figure 6:
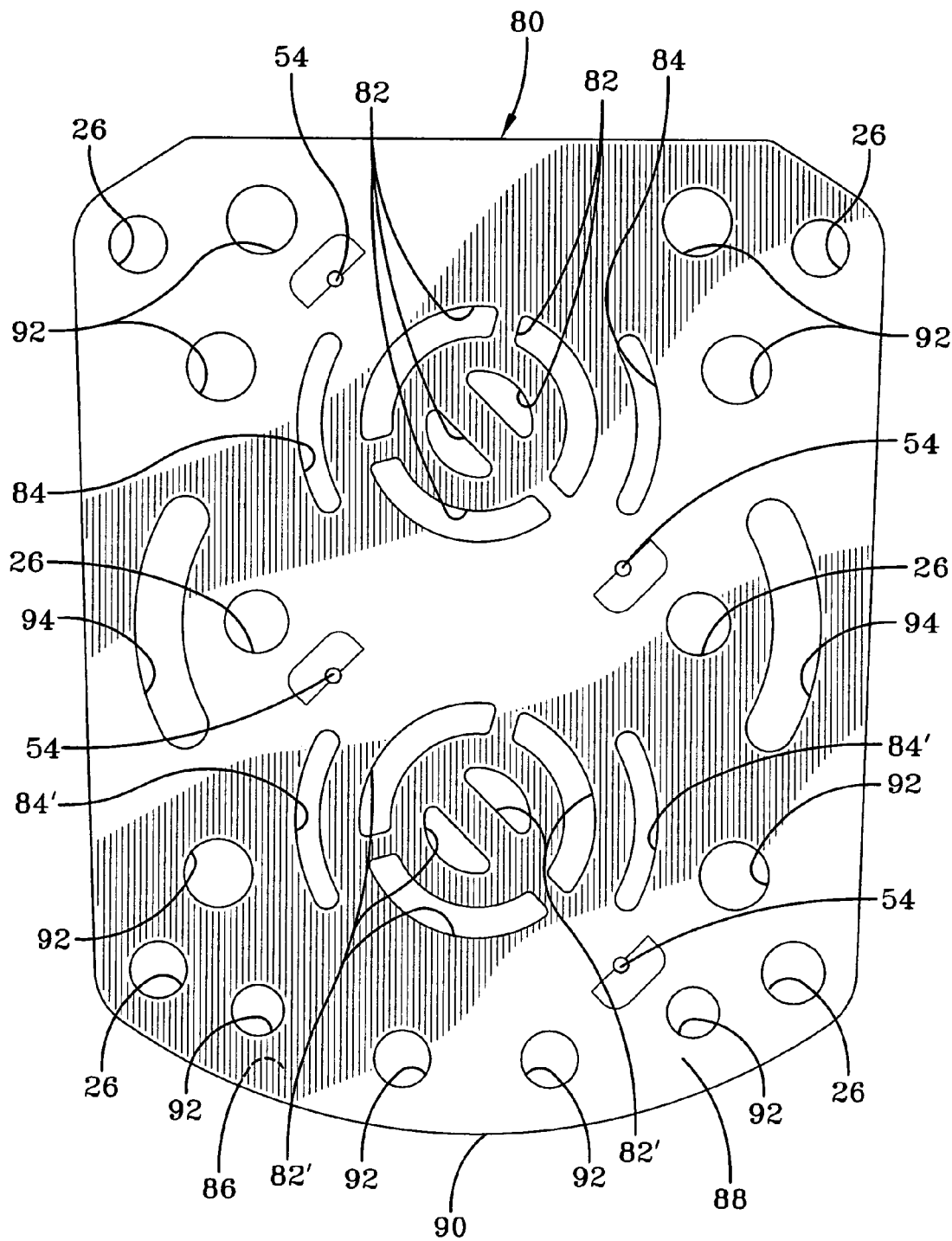
FIG. 6 is a top view of the valve plate of the present invention.

FIG. 6 is a top view of valve plate 80. Valve plate 80 includes a plurality of apertures 26 corresponding to apertures 26 in cylinder head 20 and cylinder head gasket 60, the apertures being coaxial with one another when valve plate 80, cylinder head gasket 60 and cylinder head are assembled together. Valve plate includes a series of suction slots 82 and discharge slots 84 associated with each piston/bore combination. In the preferred embodiment, there are two piston/bore combinations hence there are two sets suction slots 82, 82' and two sets of discharge slots 84, 84', one set of each associated with each piston/bore combination. Valve plate includes a first flat major surface 86 facing cylinder head 20 and a second flat major surface 88 opposed to first flat major surface 86 facing the cylinder block. Surfaces 86, 88 are joined by a periphery wall 90. First flat major surface 86 includes two pins 52 projecting away from surface 86. Pins 52 engage slots 64 in cylinder head gasket 60. preferably by a snap fit arrangement. These pins are also used to position the discharge valve 120 and discharge valve retainer 100, thereby eliminating the need for rivets as is used in prior art designs. Discharge valve 120 and discharge valve retainer 100 are not permanently affixed in position by fastening means such as rivets. Second flat major surface 88 includes a pair of pins 54 associated with each piston/bore combination projecting away from surface 88 in the direction of cylinder block. In FIG. 6 therefore, there are four pins 54. Pins 54 are used to position suction valve 140, one suction valve associated with each piston/bore combination. Pins 52, 54 are assembled to valve plate 80 as previously discussed. Valve plate also includes nonfunctional holes 92 and nonfunctional slots 94. Because valve plate 80 is larger than prior art designs, holes 92 and slots 94 are added to decrease the stiffness of valve plate 80 and assist in maintaining flatness tolerances on the valve plate. Machining of flat plate typically produces springback, which is related to plate stiffness and adversely affects flatness. However, these tolerances must be maintained in order to provide proper sealing of the suction valve and discharge valve against the valve plate to prevent leakage of gas across these interfaces during operation of the compressor. These holes 92 and slots 94 also increase the volume of the discharge plenum. Valve plate 80 preferably is a metallic plate material.

Figure 7:
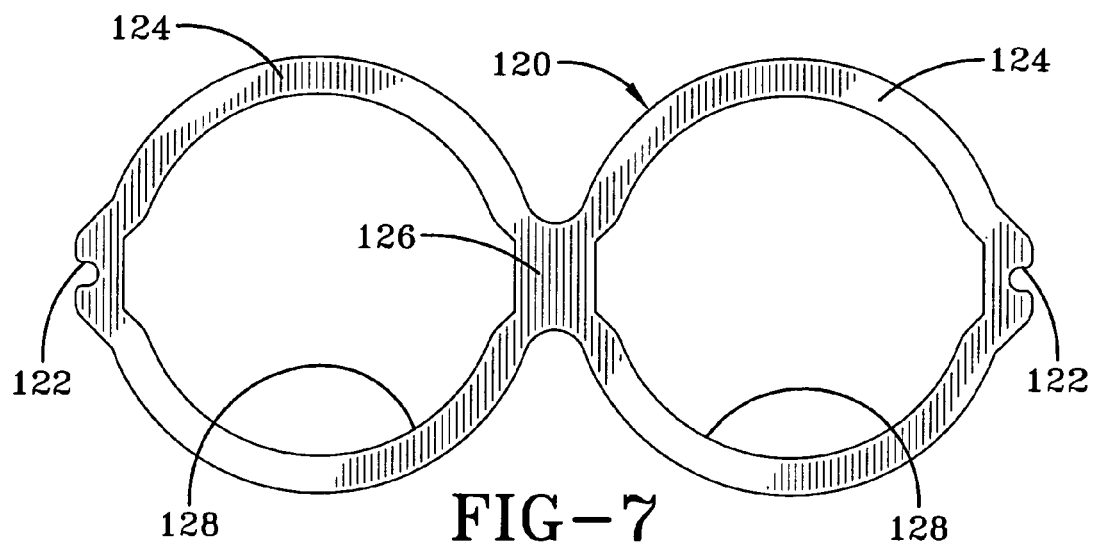
FIG. 7 is a top view of the discharge valve of the present invention.

FIG. 7 depicts the discharge valve 120 of the present invention. Discharge valve 120 is a single piece of thin spring steel that preferably is stamped. Valve includes a ring 124 of material associated with each piston/bore combination. In the embodiment shown, there are therefore two rings 124 of material. These rings 124 are joined by a material strip 126 at a central location, the rings forming a pair of bores 128. Valve 120 is positioned in contact with first flat major surface 86 of valve plate 80 by pins 52. Rings 124 are of sufficient width to completely cover discharge slots 84 of valve plate 120 when rings 124 are in contact with valve plate 80, but not so wide as to cover any other slots or holes in valve plate 80. During the suction stroke of a piston, the corresponding discharge valve ring 124 is in contact with valve plate 80, thereby preventing leakage of gas from high pressure discharge region 138 of cylinder head 20. During the compression stroke, the increased pressure of the gas pushes discharge valve ring away from valve plate at 84, 84'. For a discharge valve used in a dual piston arrangement, such as is shown in FIG. 7, one ring 124 is sufficiently stiff so that it remains in contact with valve plate 80 even as the adjacent ring is flexed away from valve plate 80 by discharge gas pressure. The discharge slots 84, 84' in valve plate 80 are arranged in an arc extending about 45° and positioned so that the center of the arc is about at right angles to the center of material strip 126, the center of material strip 126 defined approximately by the midpoint of a line extending between slots 122, so that maximum flexing of rings 148 will occur along the portion of rings 124 adjacent to the arc defining discharge slots 84 and away from material strip 126 and slots 122. This is also desirable so that discharge valve slots 122 can be captured by dowel pins and movement of discharge valve 120 in the vicinity of slots 122 is minimized or eliminated.

Figure 8:
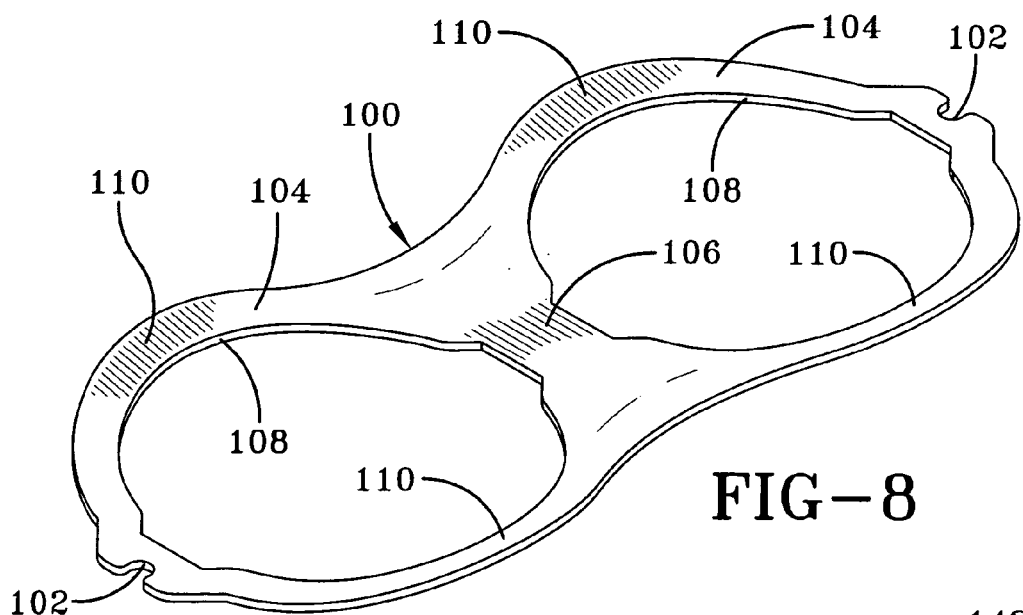
FIG. 8 is a perspective view of a discharge valve retainer of the present invention.

FIG. 8 is a perspective view of a discharge valve retainer 100 of the present invention. Retainer 100 is substantially the same shape as discharge valve 120, except that it includes a permanently formed radius in the material. The material preferably is a piece of stamped steel, but is sufficiently rigid so as to maintain its formed shape and not deflect when subjected to the alternating pressures of fluids in the cylinder head. It includes a pair of slots 102 that allow retainer 100 to be captured by dowel pins. Retainer 100 includes a ring 104 of material associated with each piston/bore combination. In the embodiment shown, there are therefore two rings 104 of material. These rings 104 are joined by a material strip 106 at a central location, the rings forming a pair of bores 108. Radii are formed in rings 104 of retainer 100 as shown in FIG. 10. When retainer 100 is assembled to pins 52, the radii extend over the arc formed by discharge slots 84 in valve plate 80, each radius smoothly transitioning to about infinity at slots 102 and to smaller radius at material strip 106. Preferably, the discharge valve retainer 100 of the present invention includes two portions of variable bend radii.

When assembled over discharge valve 120, the discharge valve retainer 100 is positioned with respect to valve plate 80 so that radii 110 face away from valve plate 80, causing a gap between discharge valve 120 and discharge valve retainer 100 when discharge valve is in the closed position, that is, in contact with valve plate 80. When viewing the assembly from the discharge valve side of valve plate 80, discharge valve retainer has a concave shape. When discharge pressure builds to force discharge valve 120 open, deflecting rings 124 away from valve plate 80, valve retainer 100 limits the movement or lift of discharge valve 120. Valve retainer contacts outwardly extending radial ribs 36 of the cylinder head at the maximum radius of the retainer, maintaining the retainer in compression. The amount of compression is controlled by the distance of the ribs below flange face 34. Rings 124 move outwardly and contact rings 104 along radii 110. Radii can be varied as desired to reduce or increase the amount of deflection of rings 124 of the discharge valve. The size of the radius is determined by the amount discharge valve 120 is designed to lift. A small capacity compressor will utilize a smaller discharge valve 120 and corresponding discharge valve retainer 100, whereas a larger compressor will utilize a larger discharge valve 120 and a larger retainer, which will have a correspondingly larger radii. For a given compressor capacity, smaller radii results in greater stresses in the discharge valve retainer 100 and discharge valve. However, the smaller radii can produce greater compressor efficiency. Larger radii result in less efficiency, but lower stresses. The size of the radii is critical to the efficiency of a compressor design. The compressor depicted in FIGS. 1–10 has a 2.5–3.5 ton capacity. Acceptable radii for discharge valve retainers 100 for such a compressor is about 1"–2", with preferred radii of about 1½". The discharge valve retainer controls the bend points of the discharge valve, hence the pair of radii in the discharge valve retainer is critical to controlling the bend points in the discharge valve, which in turn affects the stresses and life of the discharge valve. Having this knowledge, one skilled in the art can determine the proper radii as the design capacity of a compressor is varied. The gap between discharge valve 120 (in the closed position) and discharge valve retainer 100 increases with decreasing radius. As the discharge valve retainer approaches a flat configuration, the radius approaches infinity. A larger radius exists at material strip 106, but this radius can be reduced to zero if desired. The radius reduces the residual stresses in this area. However, the radius must be controlled to limit the deflection of material strip 126 in discharge valve 120. The opening of one of rings 124 should not cause the other ring to move away from valve plate, and material strip 106 must maintain strip 126 in contact with valve plate 80, as there are no other permanent mechanical means in this design, such as rivets, to accomplish this function.

Figure 9:
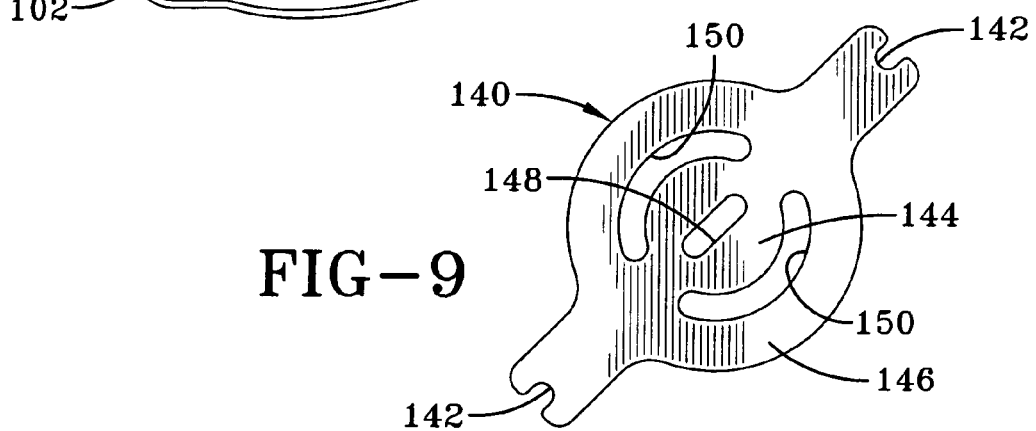
FIG. 9 is a top view of a suction valve of the present invention.

FIG. 9 depicts suction valve 140 of the present invention. There is one suction valve for each piston/bore combination. Each suction valve is a flexible material that can maintain its shape. Preferably, suction valves are stamped of a suitable spring steel of sufficient thickness to withstand multiple cycles in a compressor. In the embodiment shown in the Figures, there are two suction valves. Each suction valve 140 includes a pair of slots 142 that fit up with pins 54 to locate suction valves 140 on second flat major surface 88 of valve plate 80. Suction valves 140 include an inner concentric ring of material 144 and an outer concentric ring of material 146 that contact second flat major surface 88 and overlie valve plate suction slots 82 when in the closed position in which discharge pressure is pushing suction valve 140 against valve plate second flat major surface 88. In the suction stroke of the piston, the suction valve is opened by moving concentric rings 144, 146 away from second major surface 88 to allow low pressure refrigerant gas to flow from the low pressure source, typically the evaporator into the corresponding bore of cylinder block. Suction valve 140 also includes a central slot 148 within inner concentric ring 144 and slots 150. Slots 148, 150 increase flow area for gas flowing around valve 140 when in the open position. These slots also decrease the stiffness of the suction valve, which improves its responsiveness.

To better illustrate the varying radii featured on the perspective view of the retainer 100 shown in FIG. 8, FIG. 10 illustrates the coplanar origins or centers of curvature, which radii varying in length correspond with the various locations on the retainer 100. Each radial arc strikes a path that is perpendicular to the plane containing the centers of curvature. These origins or centers of curvature lie in a plane that includes the centerline with the radial arcs generating the profile of retainer 100, which profile is symmetric about the centerline, as shown in FIG. 8. The partially struck radial arcs 202 on the retainer 100 disposed near the slots 102 are shown having a minimum amount of curvature (e.g., resembling a straight line), as the radial length 204 is a maximum value (e.g., approaching infinity) since radial length and degree of curvature are inversely proportional. In the center of the rings 124, the partially struck radial arc 206 is shown having a maximum curvature (e.g., a curved line), therefore the radial length 208 is a minimum value. Further, at the material strip 106, the amount of curvature of partially struck radial arc 210 is intermediate the amount of curvature corresponding to position 110 of the retainer and the amount of curvature corresponding to slots 102 of the retainer. In other words, the radial length 212 is greater than radial lengths 208 but less than radial lengths 204. The radial lengths vary in a continuous fashion along the retainer from slot 102 to position 110 to strip 106 as shown in FIG. 8.

Several of the components in the combination of the present invention include improvements. When each of the components is assembled to form the combination, the valve assembly and cylinder head combination result in improved compressor efficiency. These improved features on individual elements of the invention include the addition of suction valve slots 148, 150 which improve gas flow through suction valve 140 while decreasing stiffness of suction valve, the addition of valve plate holes 92 and slots 94 to valve plate 80 which reduces the weight while improving the manufacturability of the valve plate, making it easier to maintain tolerances such as flatness of the critical flat major surfaces 86, 88, the orientation of discharge slots 84, 84' which allows for the use of a single piece discharge valve retainer 100, a cylinder head gasket design 60 that is stepped with teeth, to provide a snap fit arrangement that captures the discharge valve 120 and discharge valve retainer 100 without the use of permanent or semi-permanent fasteners such as rivets and a cylinder head 20, while also providing additional support for the valve plate in the region of suction slots (ports) 82, 82', thereby allowing for increased suction port area in the valve plate, as discussed previously.

The design of the assembly positions discharge slots 84, 84' in valve plate 80 in a position such that opening of discharge valve 120 against a retainer allows retainer 100 to be a single part with two bend radii extending the length of the part, the length extending between slots 102. The location of the arcs which can subtend an angle of from about 15° to about 75°, preferably about 55°, forming discharge slots 84 substantially parallel to a centerline of the discharge valve, the centerline defined by a line passing through slots 122, allows discharge valve retainer 100 to be a single part having two bend radii 110, one on either side of the centerline. Increased capacity can be achieved by increasing the area of the discharge slots, as may be required in larger capacity compressors. The configuration of discharge slots 84 would thus resemble slots 82, extending substantially 360° but having intermittent support segments. The configuration of discharge slots, while critical to achieve the improvements set forth herein, may take any one of a number of various forms that increase the available area through which the compressed refrigerant can pass. The configuration of the retainer 100, including importantly radii 110, is critical to both the amount of opening and the stress that discharge valve 120 is subjected to. As one skilled in the art will recognized, controlling this repetitive cyclic stress is critical to the life and reliability of valve 120. The accuracy of retainer 100 is critical to the reliability of discharge valve 120 over the life of the compressor. Discharge valve 120 is assembled immediately adjacent to first flat major surface 86 of valve plate 80. Discharge valve retainer 100 is assembled adjacent to discharge valve 120 as previously discussed. Slots 102, 122 of discharge valve retainer 100 and discharge valve 120 engage pins 52 projecting from first flat major surface 86 of valve plate 80. The discharge valve retainer 100 and discharge valve 120 are each single pieces of stamped material that are located by pins 52, but are not permanently fastened to each other or to valve plate 80. Slots 64 of cylinder head gasket 60 are assembled over slots 102 of discharge valve retainer, slots 64 having a plurality of teeth 65, see FIG. 5, to allow for a snap fit over pins 52. Portions of discharge valve retainer 100 and discharge valve 120 adjacent to their respective slots 102, 122 are captured in stepped portion of gasket 60 formed by raised region 76 under strips 72, while material strips 106, 126 of discharge valve retainer 100 and discharge valve 120 are captured under central strip 74 of gasket 60. When this combination is assembled to cylinder head, the radii 110 of discharge valve retainer contact circumferential surfaces 30, preventing any movement of these radii away from valve plate 80. Perimeter of gasket 62 contacts cylinder head. Ribs 24 extending into the suction plenum or bores 22 of cylinder head provide increased suction port area in the valve plate while providing additional support for the valve plate, thereby lowering the stresses experienced by the valve plate. Suction valves 140 are assembled to second flat major surface 88 of valve plate 80 and the assembly is assembled through apertures 26 to cylinder block 18 using mechanical fastening means such as a threaded bolt arrangement.

In the dual piston/bore combination shown in the Figures, one piston is operating in a compression stroke while the other piston is in the suction stroke. Ideally, these pistons are operating 180° out of phase. The description of the operation is identical for the two pistons, it being understood that while one piston is operating in compression, the other is operating in suction. During the suction cycle, as piston 12 moves downward in a bore 16 in cylinder block 18, suction valve 140 is moved away from valve plate 80 as previously described allowing low pressure refrigerant gas to be drawn into bore 16 from evaporator (or other reservoir of refrigerant) through bore 22 and across suction port 18, discharge valve 120 being closed by pressure in high pressure discharge region 38 and by the suction action of piston 12. This process is enhanced due to the additional flow area for gas through the valve provided by slots 148, 150 in suction valve 140, as compared to prior art suction valves in which gas flows only around the suction valve. After the piston reaches the bottom of bore 12 and begins to move upward, low pressure refrigerant gas in bore 16 is compressed and suction valve is forced closed. As the upward movement of the piston continues, pressure builds until the pressure in the bore is greater than the pressure in discharge region 38 and the force required to overcome the spring constant in discharge valve 140 is exceeded, thereby forcing discharge valve open. Even though the discharge valve is a single piece, only one ring 124 is forced open. Furthermore, the movement of this ring 124 is limited by radii 110 in discharge valve retainer 100 immediately adjacent to it. The radii 110 in ring 104, although rigid, are further prevented from moving because they contact circumferential surface 30 in cylinder head. Discharge valve 120 remains open and compressed gas passes across discharge valve 120 into high pressure discharge region 38, through discharge port 31 in cylinder head until piston 18 reaches the top of its stroke and reverses direction, thereby ending a cycle.

The valve plate assembly 50 and cylinder head 20 are assembled to the compressor 10 in the following manner. The crankshaft 14, the pistons 12, and the connecting rods are assembled to the crankcase (cylinder block) 18, with the surface of the crankcase or cylinder block that mates with the valve plate facing upward. A valve plate gasket, typically a fiber gasket material, is placed on the upward facing surface of the cylinder block. The suction valves 140 are placed on the valve plate 80 so that the slots 142 are aligned with pins 54 extending from second major surface 88 of valve plate, using a drop of oil to temporarily adhere them to valve plate 80. The second major surface 88 of the valve plate 80 is placed in contact with the valve plate gasket. The discharge valve 120 is aligned with pins 52 extending from first major surface 86 of valve plate. The discharge valve retainer 100 is placed over discharge valve 120 and aligned with pins 52. The cylinder head gasket 60 is placed over discharge valve retainer 100, aligned with pins 52 and snap fit or press fit into position on the pins. The cylinder head 20 is then placed over the cylinder head gasket 60, and the assembly is bolted together by bolts extending through apertures 26.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A discharge valve for use in a reciprocating compressor comprising:
   a plurality of rings of flexible material, each ring corresponding to a bore in the compressor each ring movable from a first position to a second discharge position;
   a strip of material between each pair of rings joining each ring of the plurality of rings; and
   a pair of slots positioned on the rings at opposed end of the valve for locating the valve in position on a valve plate.

2. The discharge valve of claim 1 wherein the valve is comprised of a spring steel.

3. The discharge valve of claim 2 wherein the spring steel is a stamped material.

4. A discharge valve retainer for use in a reciprocating compressor comprising:
   a plurality of rings of substantially rigid material, each ring corresponding to a bore in the compressor;
   a strip of material between each pair of rings joining each ring of the plurality of rings;
   a pair of slots positioned on the rings at opposed ends of the valve retainer for locating the valve retainer in position on a valve plate;
   wherein each ring in the plurality of rings includes at least one radii, the radii transitioning smoothly from about infinity adjacent to the slot to a minimum between the slot and the strip of material, so that radii face away from the valve plate when the retainer is assembled to the valve plate, such that the valve retainer has a concave shape when viewed from a first side and a convex shape when viewed from the opposite side; and
   wherein the valve retainer includes a centerline extending between the pair of slots, and a pair of rings, origins of the radii associated with each ring are coincident with a plane containing the centerline, the radii symmetric about the centerline.

5. The discharge valve retainer of claim 4 wherein the radii control opening of an associated discharge valve.

6. The discharge valve retainer of claim 4 wherein due to the radii a gap is formed between the associated discharge valve and the discharge valve retainer when the associated discharge valve is in a closed position.

7. The discharge valve retainer of claim 4 wherein retainer is a single piece of stamped material.

8. The discharge valve retainer of claim 5 wherein the radii for a 2.5–3.5 ton compressor is about 1" to about 2".

9. The discharge valve retainer of claim 7 wherein the single piece of stamped material is sufficiently rigid to maintain its shape without deflecting when subjected to compressor fluid pressures.

10. A discharge valve system for use in a reciprocating compressor having a cylinder head with a plurality of cylinders, a cylinder head gasket and a valve plate, the valve plate including projecting locating pins, the discharge valve system comprising:
    a discharge valve having a ring associated with each of the plurality of cylinders in the head, and a strip of material joining each of the rings, the joined rings forming a plurality of bores corresponding to the plurality of cylinders in the cylinder head, the discharge valve including slots so that when the discharge valve is assembled against the valve plate, the slots are aligned with the projecting locating pins in the valve plate to properly locate the discharge valve, the discharge valve being a single piece of material that moves in response to a change of pressure; and
    a discharge valve retainer having a shape that is substantially the same as the discharge valve, and having a plurality of rings corresponding to the rings in the discharge valve, and a strip of material joining each of the rings, the joined rings forming a plurality of bores corresponding to the rings in the discharge valve and the plurality of cylinders in the cylinder head, the discharge valve retainer including slots, so that when the discharge valve retainer is assembled adjacent the discharge valve, the slots are aligned with the projecting locating pins in the valve plate to properly locate the discharge valve retainer adjacent the discharge valve, the discharge valve retainer being a single piece of material having at least one radii associated with each ring, the discharge valve retainer including a centerline extending between the slots, origins of the radii being coincident with a plane containing the centerline, the radii symmetric about the centerline, the radii smoothly transitioning to infinity adjacent to the slots and up to infinity adjacent to the strip of material, the discharge valve retainer comprising a material that is rigid and does not move when contacted by the discharge valve, thereby limiting the motion of the discharge valve.

11. The discharge valve system of claim 10 wherein the discharge valve and discharge valve retainer each have two rings forming two bores corresponding to a pair of cylinders in the cylinder head.

12. The discharge valve system of claim 10 wherein the discharge valve comprises a spring steel and the discharge valve retainer comprises a stamped steel sufficiently rigid so as not to deflect when subjected to alternating compressor pressures.

13. The discharge valve system of claim 10 wherein the discharge valve and discharge valve retainer are stamped.

14. The discharge valve system of claim 12 wherein the discharge valve and discharge valve retainer are each a single piece of stamped steel.

15. The discharge valve system of claim 10 wherein the discharge valve and discharge valve retainer are assembled between the cylinder head and valve plate using the slots of the discharge valve and discharge valve retainer and the locating pins of the valve plate and without the use of fasteners.

* * * * *

UNITED STATES PATENT AND TRADEMARK OFFICE
CERTIFICATE OF CORRECTION

PATENT NO. : 7,074,022 B2
APPLICATION NO. : 11/065962
DATED : July 11, 2006
INVENTOR(S) : Majerus et al.

It is certified that error appears in the above-identified patent and that said Letters Patent is hereby corrected as shown below:

On the title page, line 1 Abstract (Item 57), "including cylinder" should be --including a cylinder--

On the title page, in the 3rd line Abstract (item 57), "to the a crankshaft" should be --to a crankshaft--

Column 1, Line 61, "to the a crankshaft" should be --to a crankshaft--

In Claim 1, at Column 11, Line 54, "at opposed end of" should be --at opposed ends of--

In Claim 7, at Column 12, Line 24, "wherein retainer" should be --wherein the retainer--

In Claim 10, at Column 12, Line 62, "one radii" should be --one radius--

Signed and Sealed this

Thirtieth Day of December, 2008

JON W. DUDAS
*Director of the United States Patent and Trademark Office*